(12) United States Patent
Hiyoshi

(10) Patent No.: US 9,650,952 B2
(45) Date of Patent: May 16, 2017

(54) VARIABLE COMPRESSION RATIO INTERNAL COMBUSTION ENGINE

(71) Applicant: NISSAN MOTOR CO., LTD., Yokohama-shi, Kanagawa (JP)

(72) Inventor: Ryosuke Hiyoshi, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/766,173

(22) PCT Filed: Dec. 26, 2013

(86) PCT No.: PCT/JP2013/084872
§ 371 (c)(1),
(2) Date: Aug. 6, 2015

(87) PCT Pub. No.: WO2014/129088
PCT Pub. Date: Aug. 28, 2014

(65) Prior Publication Data
US 2015/0377120 A1 Dec. 31, 2015

(30) Foreign Application Priority Data
Feb. 20, 2013 (JP) ................. 2013-030506

(51) Int. Cl.
*F02B 75/04* (2006.01)
*F02B 75/32* (2006.01)
(Continued)

(52) U.S. Cl.
CPC ....... *F02B 75/047* (2013.01); *F01M 11/0004* (2013.01); *F01M 11/064* (2013.01);
(Continued)

(58) Field of Classification Search
CPC .............. F02B 75/047; F01M 11/0004; F01M 11/0008; F02D 41/22; F02D 41/3076;
(Continued)

(56) References Cited

U.S. PATENT DOCUMENTS 1,901,263 A    3/1933  Ruud
4,517,931 A *  5/1985  Nelson .................... F02B 41/04
                                                    123/197.4
(Continued)

FOREIGN PATENT DOCUMENTS

EP    1 178 194 A2    2/2002
EP    2 123 869 A1    11/2009
(Continued)

OTHER PUBLICATIONS

Bollix. C. et al., "Kurbeltrieb Fuer Variable Verdichtung", Motortechnische Zeitschrift, Vieweg Verlag, Wiesbaden, DE, vol. 58, No. 11, Nov. 1, 1997, pp. 706-711, XP000724294, ISSN: 0024-8525.

*Primary Examiner* — Carlos A Rivera
*Assistant Examiner* — Syed O Hasan
(74) *Attorney, Agent, or Firm* — Drinker Biddle & Reath LLP

(57) ABSTRACT

A variable compression ratio internal combustion engine is equipped with a variable compression ratio mechanism that changes an engine compression ratio depending on the rotational position of a first control shaft arranged in an oil pan, and an actuator that changes and holds the rotational position of the first control shaft, and a linking mechanism configured to link the actuator and the first control shaft. The linking mechanism has a lever linked to the first control shaft, and a connecting pin configured to rotatably link the tip of an arm part extending radially outward from the center of the first control shaft and one end of the lever. At least when having been set to the highest compression ratio, the
(Continued)

first connecting pin is configured to be submerged below an oil level of the oil pan.

8 Claims, 6 Drawing Sheets

(51) Int. Cl.
    *F01L 1/34* (2006.01)
    *F02D 15/02* (2006.01)
    *F01M 11/06* (2006.01)
    *F01M 11/00* (2006.01)
    *F16C 9/02* (2006.01)

(52) U.S. Cl.
    CPC ............ *F02B 75/045* (2013.01); *F02D 15/02* (2013.01); *F01M 2011/0008* (2013.01); *F02B 75/32* (2013.01); *F16C 9/02* (2013.01)

(58) Field of Classification Search
    CPC ...... F02D 15/02; F02D 15/04; F02D 41/3017; F02D 41/221

USPC .................................. 123/197.4, 48 B, 90.17
See application file for complete search history.

(56) References Cited

U.S. PATENT DOCUMENTS

| | | | |
|---|---|---|---|
| 5,957,118 A * | 9/1999 | Tateno | .................. F01M 13/04 |
| | | | 123/573 |
| 6,260,532 B1 | 7/2001 | Mendler | |
| 6,729,273 B2 * | 5/2004 | Aoyama | .................. F01B 9/02 |
| | | | 123/197.4 |
| 6,920,847 B2 | 7/2005 | Hiyoshi et al. | |
| 2006/0180117 A1 | 8/2006 | Maezuru et al. | |
| 2010/0192915 A1 * | 8/2010 | Tanaka | .................. F02B 75/048 |
| | | | 123/48 B |

FOREIGN PATENT DOCUMENTS

| | | |
|---|---|---|
| JP | 2002-047955 A | 2/2002 |
| JP | 2004-257254 A | 9/2004 |
| JP | 2006-220116 A | 8/2006 |
| JP | 2008-144720 A | 6/2008 |

* cited by examiner

VARIABLE COMPRESSION RATIO INTERNAL COMBUSTION ENGINE

TECHNICAL FIELD

The present invention relates to a variable compression ratio internal combustion engine equipped with a variable compression ratio mechanism capable of changing an engine compression ratio.

BACKGROUND ART

The applicant of the present application has conventionally proposed variable compression ratio mechanisms that can change an engine compression ratio, utilizing a multi-link piston-crank mechanism (for instance, see Patent document 1 described later). Such a variable compression ratio mechanism is configured to variably control an engine compression ratio depending on an engine operating condition by changing the rotational position of a control shaft by means of an actuator such as a motor or the like.

CITATION LIST

Patent Literature

Patent document 1: Japanese Patent Provisional Publication No. JP2004-257254 (A)

SUMMARY OF INVENTION

Technical Problem

In the case of a specific structure in which the actuator of the above-mentioned variable compression ratio mechanism is arranged outside of an engine main body in order to protect the actuator from oil, exhaust heat and the like, the actuator and the control shaft are linked to each other by means of a linking mechanism equipped with a lever configured to penetrate a sidewall of the engine main body. One end of the lever is linked to an arm part of the control shaft through a connecting pin. For instance, the control shaft is arranged inside of an oil pan, mounted onto the underside of the engine main body. The control shaft is rotatably supported on the side of the engine main body.

In the variable compression ratio internal combustion engine having the specific structure as discussed above, the combined alternating load of a combustion load and an inertia force of the internal combustion engine repeatedly acts on the linking mechanism that links the control shaft and the actuator. By the way, a prescribed clearance is secured at the bearing part of the connecting pin that rotatably links the lever and the arm part. Hence, owing to the previously-discussed repeatedly-acting alternating load, vibration and noise tend to occur, thereby deteriorating the performance of noise/vibration. Furthermore, owing to a progress of wear of the bearing part with use of the mechanism, the clearance of the bearing part tends to increase and thus it is easy to cause a deterioration in the performance of noise/vibration.

In particular, in a high-speed low-load range in which alternating load tends to easily increase, setting to the high-compression-ratio side is used. Thus, there is a problem of a deterioration in the performance of noise/vibration when having been set to the high-compression-ratio side.

Solution to Problem

It is, therefore, in view of the previously-described circumstances, the invention is equipped with a variable compression ratio mechanism configured to change an engine compression ratio depending on a rotational position of a control shaft arranged in an oil pan of an engine main body, an actuator configured to change and hold the rotational position of the control shaft, and a linking mechanism configured to link the actuator and the control shaft, the linking mechanism having a lever linked to the control shaft, a connecting pin rotatably linking the tip of an arm part extending radially outward from a center of the control shaft and one end of the lever. The invention is characterized in that, at least when having been set to a highest compression ratio, the connecting pin is set or configured to be submerged below an oil level of the oil pan.

Advantageous Effects of Invention

According to the invention, at least when having been set to the highest compression ratio, the connecting pin can be submerged in oil below the oil level of the oil pan, and hence it is possible to suppress a progress of wear of the bearing part by improving the lubricating performance while suppressing a deterioration in the performance of noise/vibration.

DESCRIPTION OF EMBODIMENTS

Figure 1:
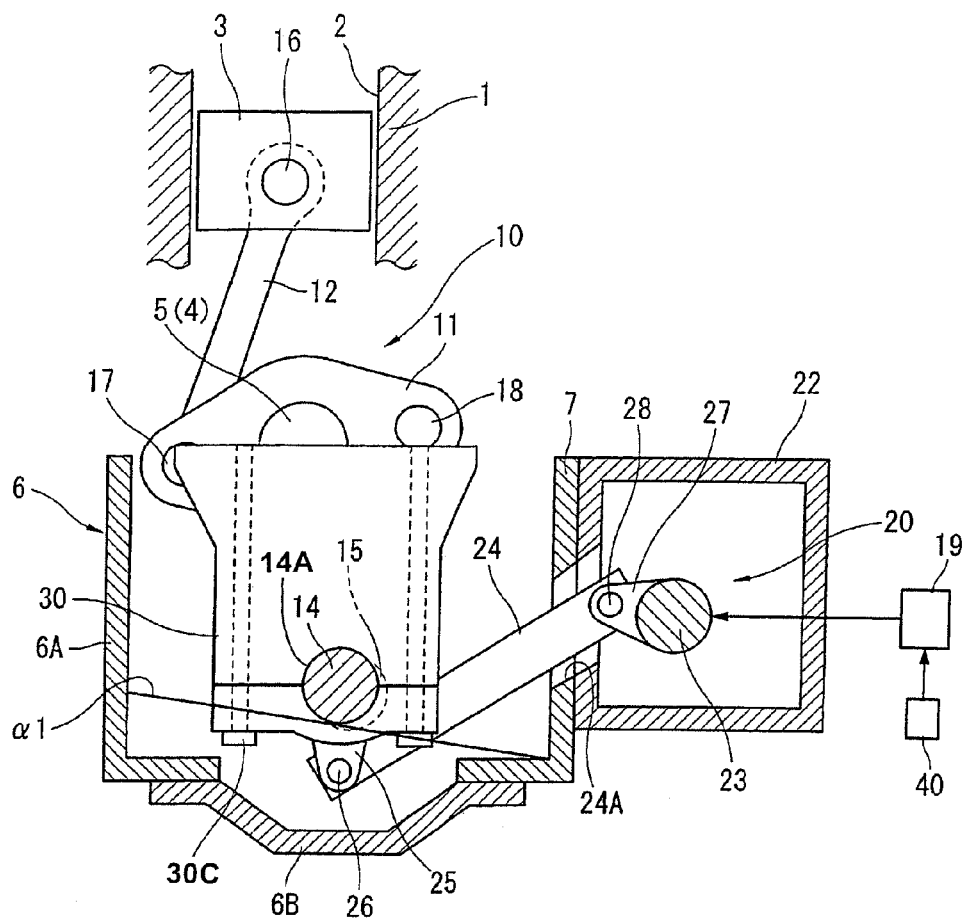
FIG. 1 is a cross-sectional view illustrating a variable compression ratio internal combustion engine equipped with a variable compression ratio mechanism according to one embodiment of the invention.

Preferred embodiments of the present invention are hereinafter described with reference to the drawings. The structural drawings of FIGS. 1-4 are schematically shown as compared to those of FIGS. 5-6, but all of these drawings, i.e., FIGS. 1 to 6 are the cross-sectional views each illustrating the same embodiment. First of all, a variable compression ratio mechanism 10, which utilizes a multi-link piston-crank mechanism, is hereunder explained. By the way, this mechanism 10 is publicly known as set forth in Japanese patent provisional publication No. 2004-257254 (A), and thus its construction is hereunder described briefly.

A piston 3 of each engine cylinder is installed in a cylinder block 1, which constructs a part of an internal combustion engine, and slidably fitted into a cylinder 2. Also, a crankshaft 4 is rotatably supported by the cylinder block. Variable compression ratio mechanism 10 has a lower link 11, an upper link 12, a first control shaft 14, an eccentric shaft 15, and a control link 13. The lower link is rotatably installed on a crankpin 5 of crankshaft 4. The upper link links the lower link 11 and the piston 3. The first control shaft is rotatably supported on the side of the engine main body, such as the cylinder block 1. The eccentric shaft is arranged eccentrically with respect to the control shaft 14. The control link links the eccentric shaft 15 and the lower link 11. Piston 3 and the upper end of upper link 12 are connected together via a piston pin 16 so as to permit relative rotation. The lower end of upper link 12 and lower link 11 are connected together via an upper-link side connecting pin 17 so as to permit relative rotation. The upper end of control link 13 and lower link 11 are connected together via a control-link side connecting pin 18, so as to permit relative rotation The lower end of control link 13 is rotatably installed on the eccentric shaft 15.

A motor 19, which serves as an actuator of the variable compression ratio mechanism 10, is connected to the first control shaft 14 via a linking mechanism 20 equipped with a speed reducer (not shown). A piston stroke characteristic, including a piston top dead center (TDC) position and a piston bottom dead center (BDC) position, changes with an attitude change of lower link 11, created by changing a rotational position of the first control shaft 14 by the motor 19. Hence, an engine compression ratio changes. Thus, it is possible to control the engine compression ratio depending on an engine operating condition by controlling the drive (the operation) of motor 19 by means of a control part 40. By the way, the actuator is not limited to such an electric motor 19, but a hydraulically-operated actuator may be used.

The first control shaft 14 is rotatably housed in an oil pan 6 mounted onto the underside of cylinder block 1 and configured to store lubricating oil. Oil pan 6 is constructed by an oil pan upper 6A fixed to the underside of cylinder block 1 and an oil pan lower 6B fixed to the underside of oil pan upper 6A in a manner so as to close the opening of the underside of oil pan upper 6A. On the other hand, motor 19 is arranged outside of the engine main body. In more detail, the motor is attached to a side face of a housing 22, facing the rear side of the engine. The housing is installed on an intake-side sidewall 7 (hereinafter referred to as "oil pan sidewall") of oil pan upper 6A, constructing a part of the engine main body.

The previously-discussed speed reducer is configured to reduce rotation of the output shaft of motor 19 and to transmit the reduced rotation to the first control shaft 14. For instance, a speed reducer of a particular structure utilizing a wave-motion gear mechanism is used. However, the speed reducer is not limited to a particular structure utilizing a wave-motion gear mechanism, but another type speed reducer, such as a cycloid planetary-gear speed reducer or the like, may be utilized as a speed reducer.

Linking mechanism 20 is also provided with a second control shaft 23 formed integral with the output shaft of the speed reducer. In lieu thereof, the output shaft of the speed reducer and the second control shaft 23 may be configured to be separated from each other and mechanically linked to each other so that both of these shafts rotate in synchronism with each other.

The second control shaft 23 is rotatably accommodated and disposed in the housing 22 arranged alongside of the oil pan sidewall 7, in a manner so as to extend in the fore-and-aft direction of the engine (that is, in the direction parallel to the first control shaft 14) along the oil pan sidewall 7. The first control shaft 14, arranged inside of the engine main body in which lubricating oil is splashed, and the second control shaft 23, arranged outside of the engine main body, are mechanically linked to each other by means of a lever 24 configured to penetrate the oil pan sidewall 7. Hence, both of the shafts 14, 23 rotate in synchronism with each other.

By the way, a slit 24A, through which the lever 24 is inserted, is formed through both the oil pan sidewall 7 and the housing 22. Housing 22 is attached to the oil pan sidewall 7 in a fluid-tight fashion in a manner so as to close the periphery of slit 24A.

One end of lever 24 and the tip of a first arm part 25 extending radially outward from the center of the first control shaft 14 are linked to each other through a first connecting pin 26 so as to permit relative rotation. The other end of lever 24 and the tip of a second arm part 27 extending radially outward from the center of the second control shaft 23 are linked to each other through a second connecting pin 28 so as to permit relative rotation.

With the previously-discussed link structure, when the first control shaft 14 rotates, the engine compression ratio changes, and the attitudes of the first arm part 25, the second arm part 27, and the lever 24 change. Hence, a speed reduction ratio of a rotational-power transmission path from the motor 19 to the first control shaft 14 also changes.

By the way, the previously-discussed first control shaft 14 corresponds to a "control shaft" of the invention, whereas the first connecting pin 26 corresponds to a "connecting pin" of the invention.

A main journal portion of crankshaft 4 and a journal portion 14A of the first control shaft 14 are rotatably supported on the side of the engine main body by means of a bearing cap 30 fixed to the cylinder block 1 serving as part of the engine main body. Bearing cap 30 is constructed by a main bearing cap 30A and a sub bearing cap 30B. These two bearing caps are fixed to the underside of a bulkhead (not shown) of cylinder block 1 by means of cap-mounting bolts 30C common to them. The first control shaft 14 is rotatably supported between the main bearing cap 30A and the bulkhead. The second control shaft 23 is rotatably supported between the main bearing cap 30A and the sub bearing cap 30B.

Figure 5:
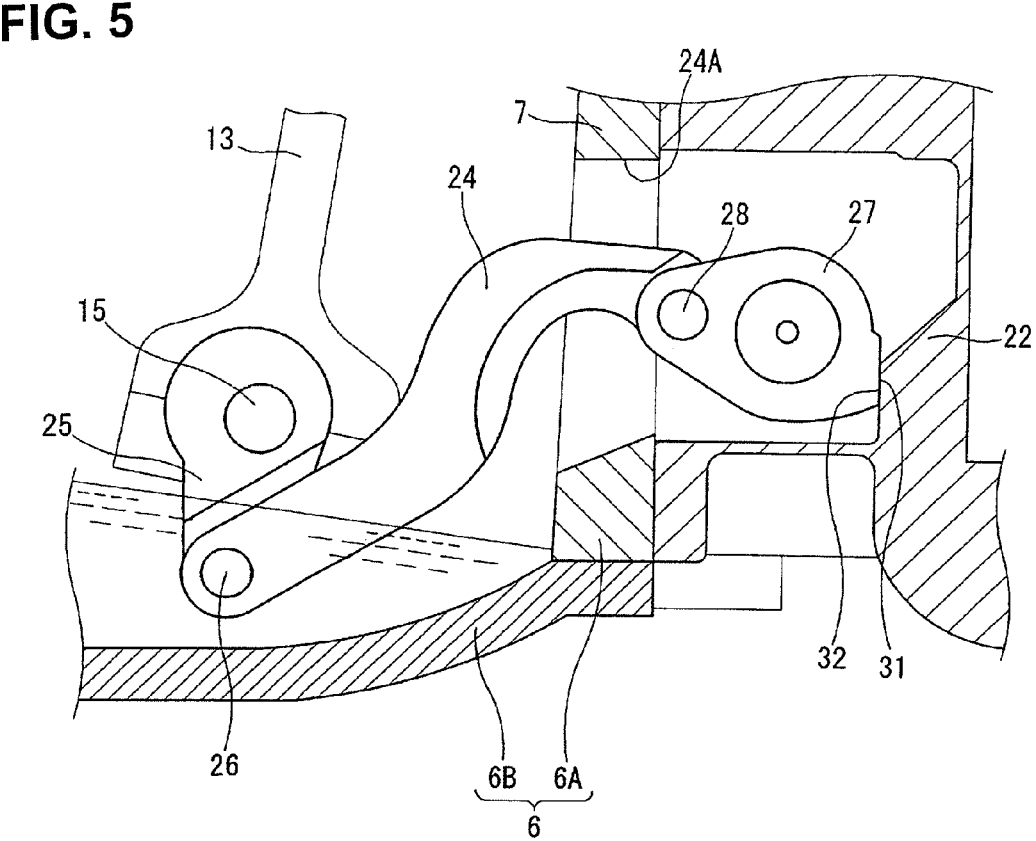
FIG. 5 is a cross-sectional view illustrating the vicinity of a lever in the case of setting to the highest compression ratio.
Figure 6:
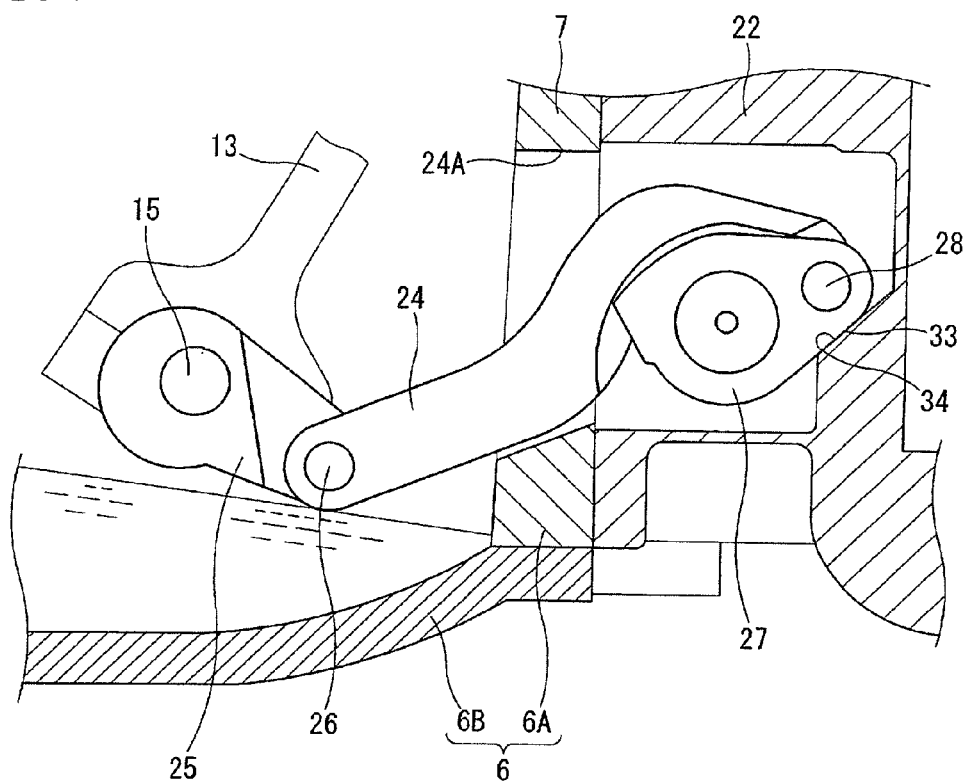
FIG. 6 is a cross-sectional view illustrating the vicinity of the lever in the case of setting to the lowest compression ratio.

As shown in FIG. 5, when having been set to a highest compression ratio at which the first control shaft 14 has been rotated to a maximum clockwise rotational position, a first stopper surface 31 provided on the second arm part 27 of the second control shaft 23 has been brought into abutted-engagement with a second stopper surface 32 provided on the housing 22, so as to restrict a further clockwise rotary motion of the first control shaft 14. As shown in FIG. 6, conversely when having been set to a lowest compression ratio at which the first control shaft 14 has been rotated to a maximum anticlockwise rotational position, a third stopper surface 33 provided on the second arm part 27 of the second control shaft 23 has been brought into abutted-engagement with a fourth stopper surface 34 provided on the housing 22, so as to restrict a further anticlockwise rotary motion of the second control shaft 23. These first to fourth stoppers 31-34 construct a stopper mechanism that mechanically restricts a rotational range of the first control shaft 14.

Specific configuration and operation and effects of the embodiment are hereunder enumerated.

(1) As shown in FIG. 1, at least when having been set to a highest compression ratio, the first connecting pin 26 is set or configured such that the whole of the first connecting pin is submerged below the position of an oil level α1 of oil pan 6 during operation of the engine.

The high compression ratio setting is used in a high-speed and low-load range, and thus alternating load tends to increase. The performance of noise/vibration tends to be greatly affected by the increased alternating load. However, in the present embodiment, in the case of the settings to high compression ratios containing the highest compression ratio discussed above, the whole of the first connecting pin 26 is allowed to be submerged below the oil level. Hence, the clearance of the bearing part of the first connecting pin 26 is filled with lubricating oil, and therefore it is possible to suppress vibration and noise from occurring owing to rattling in the clearance, thereby suppressing a deterioration in the performance of noise/vibration.

In contrast, the low compression ratio setting is used in a high-load range. Regarding the loads acting on the first connecting pin 26, the magnitude of a maximum combustion load tends to become much greater than the magnitude of inertia load acting in the direction opposite to the direction of action of the maximum combustion load. Hence, rattling in the clearance of the bearing part of the first connecting pin 26 is less. The less rattling exerts only slight influence on a deterioration in the performance of noise/vibration.

Also, in a normal operating range, the high compression ratio setting is often used. As explained with reference to the embodiment, in the case of the settings to high compression ratios in which silence is required owing to the low load and low noise level, it is effective to improve the performance of noise/vibration. Conversely, in the case of the settings to low compression ratios, which are used in a high-load range, the noise level is almost always high. Hence, a deterioration in the performance of noise/vibration can be permitted as compared to the settings to high compression ratios.

(2) As shown in FIG. 1, the oil level $\alpha 1$ of oil pan 6 is set to lie midway between the center of the first control shaft 14 and the center of the first connecting pin 26. More concretely, as shown in FIG. 1, at least when having been set to the highest compression ratio, the whole of the first control shaft 14 is set to be positioned above the oil level.

Therefore, by arranging the first control shaft 14 above the oil level without the first control shaft being submerged in oil while improving the lubricating performance for the first connecting pin 26, it is possible to suppress an increase in oil agitation resistance caused by oscillating motion of the control link 13 pivotably linked to the first control shaft 14.

Figure 2:
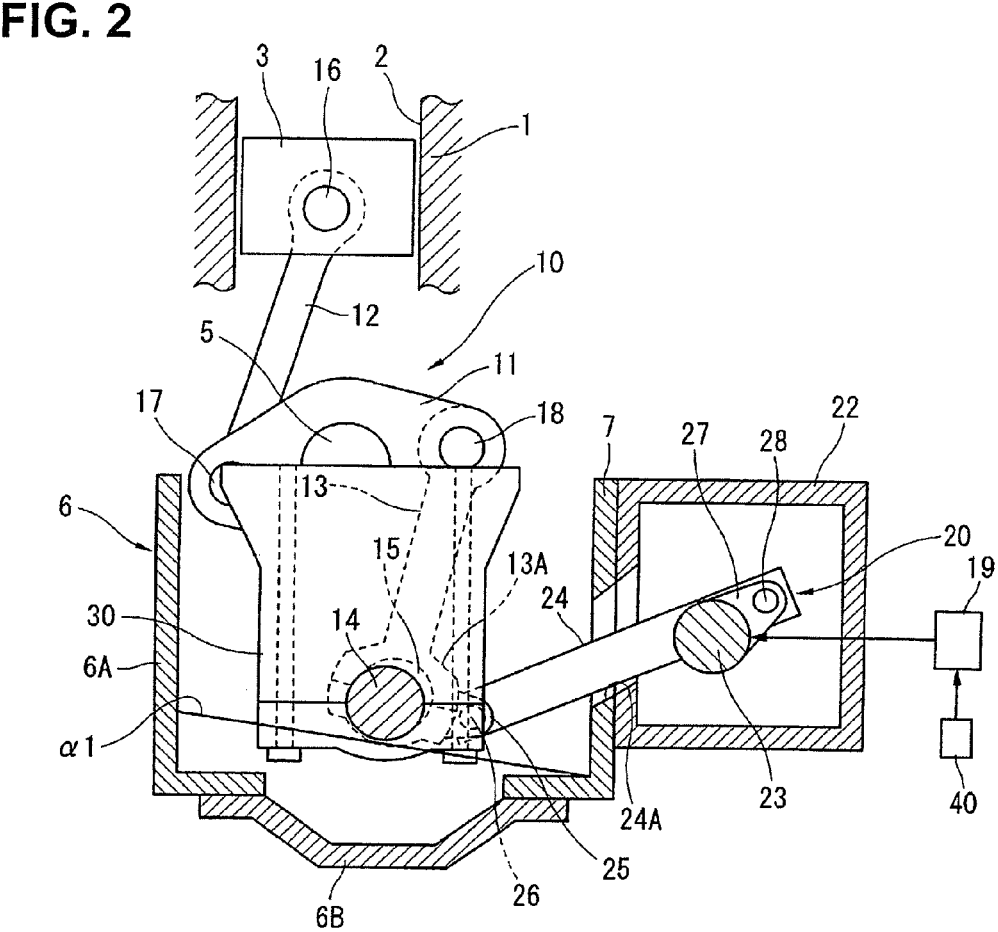
FIG. 2 is another cross-sectional view illustrating the same variable compression ratio internal combustion engine of the embodiment.

(3) As shown in FIG. 2, when having been set to a compression ratio at which the first connecting pin 26 is positioned farthest away upwardly from the oil level $\alpha 1$ of oil pan 6, more concretely, in the case of the lowest compression ratio setting at which the first control shaft 14 has been rotated to the maximum anticlockwise rotational position, as viewed from the axial direction of the first control shaft 14, the first connecting pin 26 is set to be positioned near the outer diameter line 13A of a large end of control link 13 at which the eccentric shaft 15 is provided. In more detail, the first connecting pin 26 is set to be positioned on the contour line of the outer diameter line 13A.

In this manner, by arranging the first connecting pin 26 near the outer diameter line 13A of the large end of control link 13, at which oil-level fluctuations and oil-splashing amount tend to increase due to agitation of the oil level, as shown in FIG. 2, it is possible to ensure a sufficient amount of oil supply to the first connecting pin 26 without the first connecting pin 26 being submerged. As a result of this, it is possible to improve the lubricating performance and to improve the performance of noise/vibration due to formation of a film of oil adhered to the bearing part of the first connecting pin 26.

Figure 3:
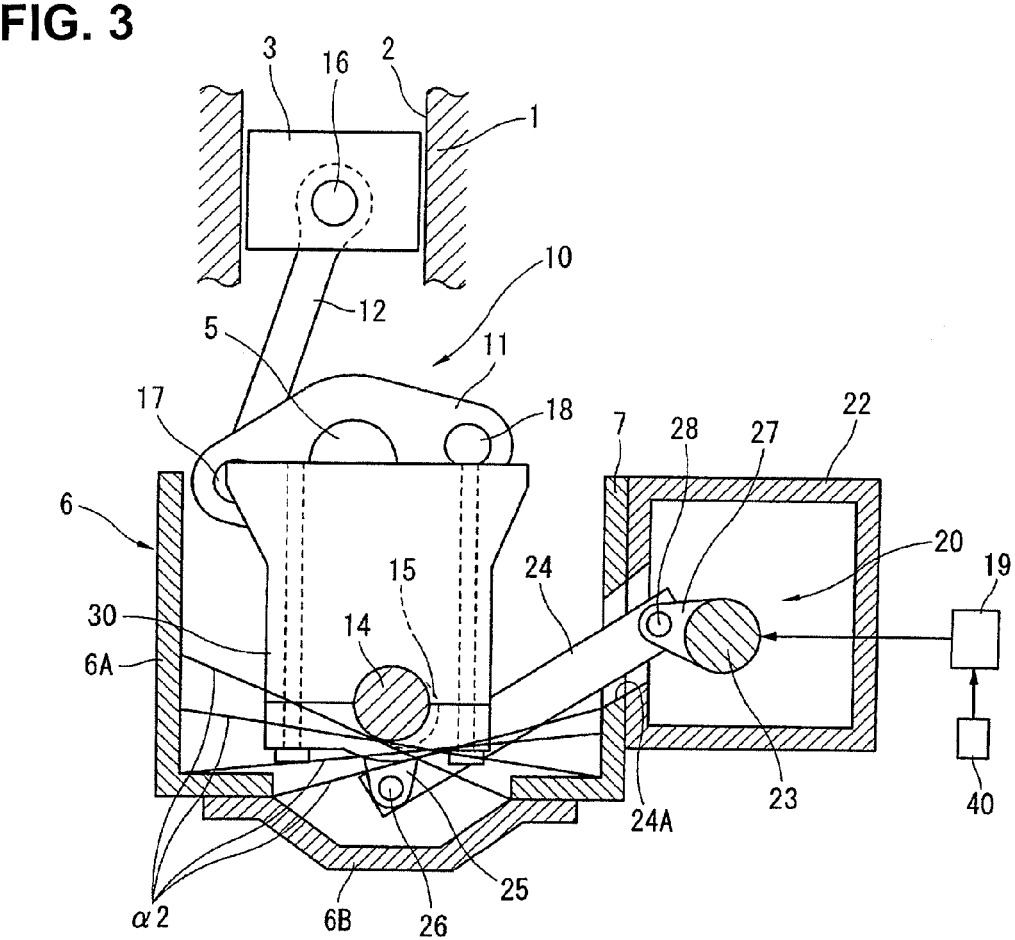
FIG. 3 is another cross-sectional view illustrating the same variable compression ratio internal combustion engine of the embodiment.

(4) As shown in FIG. 3, when having been set to any one of high compression ratios containing at least the highest compression ratio, the first connecting pin 26 is set to be always submerged below oil levels $\alpha 2$ of oil pan 6 regardless of respective positions of oil levels $\alpha 2$ of oi pan 6 during oil-level fluctuations.

Therefore, even when oil-level fluctuations are occurring owing to acceleration/deceleration conditions, in the case of the settings to high compression ratios, there is no risk that the first connecting pin 26 comes out of the respective oil levels, and thus the first connecting pin 26 is always submerged in oil. Hence, it is possible to suppress a deterioration in the performance of noise/vibration.

Figure 4:
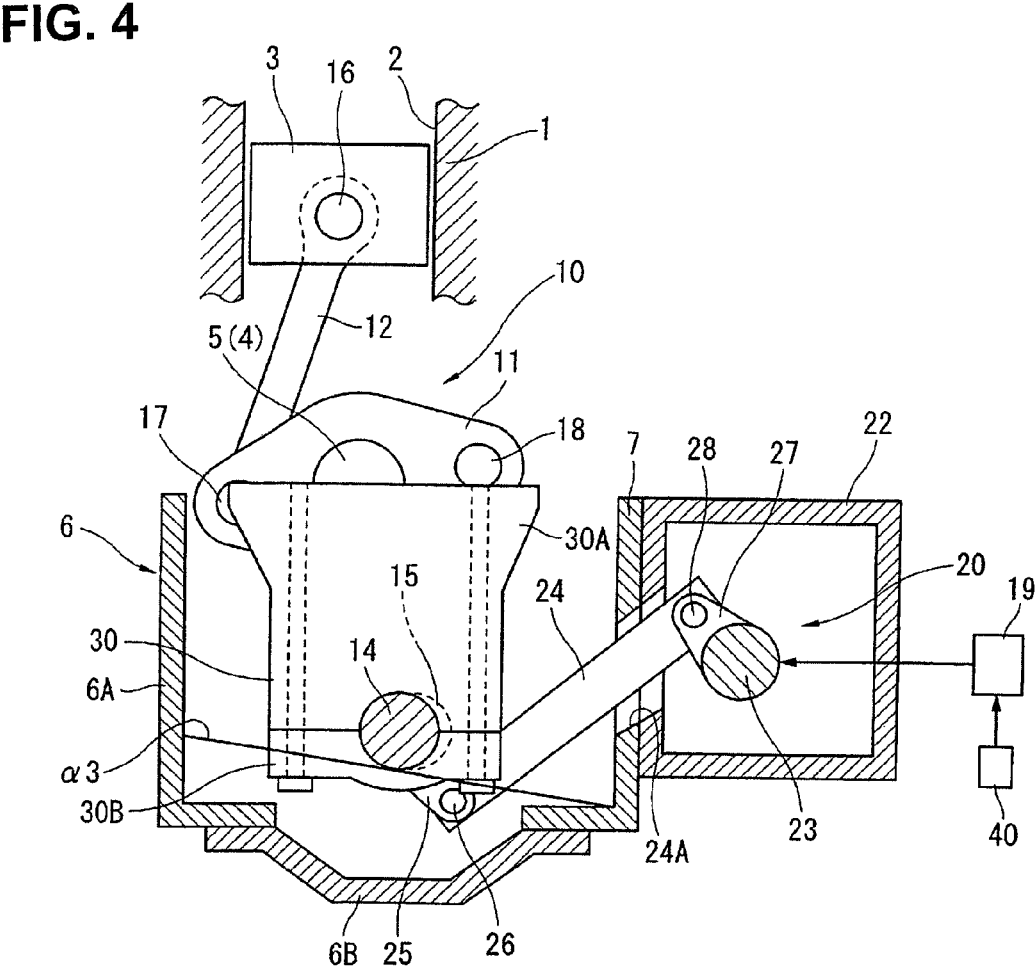
FIG. 4 is another cross-sectional view illustrating the same variable compression ratio internal combustion engine of the embodiment.

(5) As shown in FIG. 4, when stopping the engine, setting to a predetermined intermediate compression ratio suitable for start is carried out, and when having been set to the predetermined intermediate compression ratio, the first connecting pin 26 is set to be submerged below an oil level $\alpha 3$ of oil pan 6 when stopping the engine.

Therefore, during stopping of the engine, the first connecting pin is maintained in a state where its bearing part has been submerged in oil. Hence, even when the first connecting pin 26 comes out of the oil level $\alpha 3$ owing to setting to a high-load low-compression-ratio in the case of no forcible oil supply to the first connecting pin 26 or immediately after start, it is possible to ensure sufficient lubricity.

While the foregoing is a description of the preferred embodiments carried out the invention, it will be understood that the invention is not limited to the particular embodiments shown and described herein, but that various changes and modifications may be made without departing from the scope or spirit of this invention. For instance, in the previously-discussed variable compression ratio mechanism, the control link is linked to the lower link. In lieu thereof, another structure in which the control link is linked to the upper link may be used.

The invention claimed is:

1. A variable compression ratio internal combustion engine comprising: a variable compression ratio mechanism configured to change an engine compression ratio depending on a rotational position of a control shaft arranged in an oil pan of an engine main body; an actuator configured to change and hold the rotational position of the control shaft: and a linking mechanism configured to link the actuator and the control shaft, the linking mechanism comprising: a lever linked to the control shaft; and a connecting pin rotatably linking a tip of an arm part extending radially outward from a center of the control shaft and one end of the lever, wherein at least when having been set to a highest compression ratio, the connecting pin is set such that the connecting pin is submerged below an oil level of the oil pan, for supplying lubricating oil to the connecting pin and for suppressing noise and vibrations at high compression ratios containing the highest compression ratio, and wherein: when having been set to a high compression ratio, the connecting pin is set to be always submerged below the oil levels of the oil pan regardless of respective positions of the oil levels of the oil pan during oil-level fluctuations.

2. The variable compression ratio internal combustion engine as recited in claim 1, wherein:
the oil level of the oil pan is set to lie midway between the center of the control shaft and a center of the connecting pin.

3. The variable compression ratio internal combustion engine as recited in claim 1, wherein:
the variable compression ratio mechanism comprises:
a lower link rotatably installed on a crankpin of a crankshaft;
an upper link configured to link the lower link and a piston; and a control link configured to link an eccentric shaft arranged eccentrically with respect to the control shaft and any one of the lower link and the upper link, wherein, when having been set to a compression ratio at which the connecting pin is positioned farthest away upwardly from the oil level of the oil pan, as viewed from an axial direction of the control shaft, the connecting pin is set to be positioned near an outer diameter line of a large end of the control link to which the eccentric shaft is linked.

4. The variable compression ratio internal combustion engine as recited in claim 1, wherein:

when stopping the engine, setting to a predetermined intermediate compression ratio is carried out, and when having been set to the predetermined intermediate compression ratio, the connecting pin is set to be submerged below an oil level of the oil pan when stopping the engine.

5. A variable compression ratio internal combustion engine comprising:

a variable compression ratio mechanism configured to change an engine compression ratio depending on a rotational position of a control shaft arranged in an oil pan of an engine main body;

an actuator configured to change and hold the rotational position of the control shaft; and a linking mechanism configured to link the actuator and the control shaft, the linking mechanism comprising:

a lever linked to the control shaft; and a connecting pin rotatably linking a tip of an arm part extending radially outward from a center of the control shaft and one end of the lever, wherein at least when having been set to a highest compression ratio, the connecting pin is set such that the connecting pin is submerged below an oil level of the oil pan, and wherein when having been set to a high compression ratio, the connecting pin is set to be always submerged below the oil levels of the oil pan regardless of respective positions of the oil levels of the oil pan during oil-level fluctuations.

6. The variable compression ratio internal combustion engine as recited in claim 5, wherein:

the oil level of the oil pan is set to lie midway between the center of the control shaft and a center of the connecting pin.

7. The variable compression ratio internal combustion engine as recited in claim 5, wherein:

the variable compression ratio mechanism comprises:

a lower link rotatably installed on a crankpin of a crankshaft;

an upper link configured to link the lower link and a piston; and a control link configured to link an eccentric shaft arranged eccentrically with respect to the control shaft and any one of the lower link and the upper link, wherein, when having been set to a compression ratio at which the connecting pin is positioned farthest away upwardly from the oil level of the oil pan, as viewed from an axial direction of the control shaft, the connecting pin is set to be positioned near an outer diameter line of a large end of the control link to which the eccentric shaft is linked.

8. The variable compression ratio internal combustion engine as recited in claim 5, wherein:

when stopping the engine, setting to a predetermined intermediate compression ratio is carried out, and when having been set to the predetermined intermediate compression ratio, the connecting pin is set to be submerged below an oil level of the oil pan when stopping the engine.

* * * * *